United States Patent
Mody et al.

(10) Patent No.: US 6,207,241 B1
(45) Date of Patent: Mar. 27, 2001

(54) CORROSION AND FIRE RESISTANT COMPOSITE CONDUITS AND METHOD OF MAKING

(76) Inventors: Jeh Mody, 3507 Lomas Serenas Dr., Escondido, CA (US) 92029; Mark Livesay, Sunrez Corp., 392 Coogan Way, El Cajon, CA (US) 92020

(*) Notice: Subject to any disclaimer, the term of this patent is extended or adjusted under 35 U.S.C. 154(b) by 0 days.

(21) Appl. No.: 09/245,893

(22) Filed: Feb. 8, 1999

Related U.S. Application Data
(60) Provisional application No. 60/074,060, filed on Feb. 9, 1998.

(51) Int. Cl.$^7$ .............................. B29D 22/00; B29D 23/00
(52) U.S. Cl. ................... 428/34.1; 428/36.1; 428/36.91; 428/376; 428/398
(58) Field of Search ................................ 428/36.1, 36.91, 428/34.1, 35.7, 376, 398, 688, 921; 174/68.1

(56) References Cited

U.S. PATENT DOCUMENTS

| | | | | |
|---|---|---|---|---|
| 4,076,540 | * | 2/1978 | Stossel | 106/15 FP |
| 4,081,303 | * | 3/1978 | Rogers et al. | 156/192 |
| 4,122,203 | * | 10/1978 | Stahl | 428/309 |
| 4,282,905 | * | 8/1981 | Dopkin et al. | 156/74 |
| 4,347,090 | * | 8/1982 | Anderson et al. | 156/149 |
| 5,298,299 | * | 3/1994 | Shea | 428/34.5 |
| 5,500,164 | * | 3/1996 | Livesay et al. | 264/459 |
| 5,679,425 | * | 10/1997 | Plumley | 428/35.7 |
| 5,723,515 | * | 3/1998 | Gottfried | 523/179 |
| 5,837,621 | * | 11/1998 | Kajander | 442/143 |

* cited by examiner

Primary Examiner—Bruce H. Hess
Assistant Examiner—B. Shewareged
(74) Attorney, Agent, or Firm—Shlesinger Arkwright & Garvey, LLP

(57) ABSTRACT

A composite conduit comprising an inner layer of fibrous material impregnated with a corrosion resistant resin and a fire resistant outer layer thereon, the outer layer comprising a fibrous material impregnated with an effective amount of calcium sulfate.

7 Claims, 1 Drawing Sheet

CORROSION AND FIRE RESISTANT COMPOSITE CONDUITS AND METHOD OF MAKING

CROSS-REFERENCE TO RELATED APPLICATIONS

This application is based upon copending provisional application Ser. No. 60/074,060 filed Feb. 9, 1998.

FIELD OF THE INVENTION

The present invention concerns improved composite conduits or ducts for conveying fluids or gases and to the manufacture of such ducts.

BACKGROUND OF THE INVENTION

Composite conduits, ducts or pipes are designed to convey corrosive exhaust fumes such as toxic, noxious and flammable vapors, dust or other contaminants, abrasive materials and the like. Such fumes or gases are typically generated within an industrial plant although they may also be used for odor control within a municipal facility exhaust system. In the usual case however, the various chemicals employed during the manufacturing process generate vapors that are removed from the plant via the plant air duct system.

In view of the above, the construction of the duct has to be such that the inner layer of the duct is rendered impervious to a wide range of acid/caustic/solvent fumes as well as to the condensation of toxic vapors on the inside surface of the duct or conduit. Hitherto, such conduits were manufactured out of metal and their alloys. As a result, conduits constructed from these alloys corrode over time. In more recent years, metal conduits lined with corrosion resistant polymers have been made available; however, limitations such as short flanged sections, retrofit difficulties, etc. make the installation costs prohibitive.

The increased emphasis in the recent years on air pollution control systems, has resulted in a need for replacement materials. Plastic ducts have gained tremendous ground in replacing the more expensive metal conduits. In particular, thermoplastic materials such as polyvinyl chloride and polypropylene as well as fiberglass reinforced plastic materials have been used extensively to fabricate fume exhaust ductwork. However, such materials are not fire resistant and therefore susceptible to burn and decomposition once exposed to heat and flames. Even if the exposure to flames is not continuous, many prior art plastic conduits, including those having a phenolic resin exteriors, emit toxic fumes, causing yet another hazard.

Frequently, the ductwork is located within highly inaccessible areas of the facility and therefore a sprinkler system will be required if the ductwork is not constructed from fire-resistant materials. Fires are caused for a variety of reasons; for example, spontaneous combustion, frictional heat, or static electricity. It is therefore increasingly necessary for the duct to be manufactured from materials having resistance to heat and fire.

Even though many plastics are said to be corrosion proof, continuous passage of corrosive fumes along the inner surface of the conduit will, over time, corrode and weaken the duct. In an effort to resist such chronic corrosion, plastic conduits are often reinforced with so-called "veils" that are impervious to various corrosive chemicals.

In the past few years, various types of thermosetting resins have been used such as isopthalic, orthopthalic, bisphenols, chlorendic anhydrides, epoxies and vinylesters. A problem common to all these materials is flammability, since they each burn rapidly and generate substantial amounts of smoke. Many attempts have been made to reduce the flammability of these materials. This is usually done through the addition of various chemicals and filler materials known to interfere with and thus retard combustion.

Up to the present time, no single conduit material has been able to resist all the various chemicals used in most industries nor provide a degree of fire retardance sufficient to obviate the need for a supplemental sprinkler system. As is apparent, considerable savings may be achieved with a duct system that does not require various internal sprinklers, drains and support members otherwise necessary to bring the duct up to required safety standards. A need has therefore existed in the art for a conduit system having high corrosion resistant properties while at the same time providing high resistance to fire and temperature yet does not emit toxic gases when exposed to such high temperatures.

OBJECTS AND SUMMARY OF THE INVENTION

It is an object of this invention to make a more economical composite conduit in terms of price, since the gypsum material layer of the present invention is available in abundance and is significantly less expensive per pound than the other fire resistant resin systems and additives available in the market.

It is yet another object of this invention to provide a composite conduit that is easier to manufacture and process than the prior art since the gypsum material employed within the outer layer is a mineral rather than an organic compound, such as a resin. More particularly, because the gypsum material does not contain the volatile organic compounds (VOCs) found within prior art resins, a governmental permit is not required for handling of the material nor is the material regulated by the Air Pollution Control District and the Air Quality Maintenance Department or other such regulatory department nor is its use a threat to the environment.

In summary the present invention is directed to a composite conduit having an inner layer comprising of a fibrous material impregnated with a resin material adapted to render the layer corrosion resistant, and an outer layer comprising a fibrous material impregnated with a gypsum type cement material adapted to render the layer fire resistant. The present invention is also directed to a method for making such a conduit.

DETAILED DESCRIPTION OF THE PREFERRED EMBODIMENTS

Figure 1:
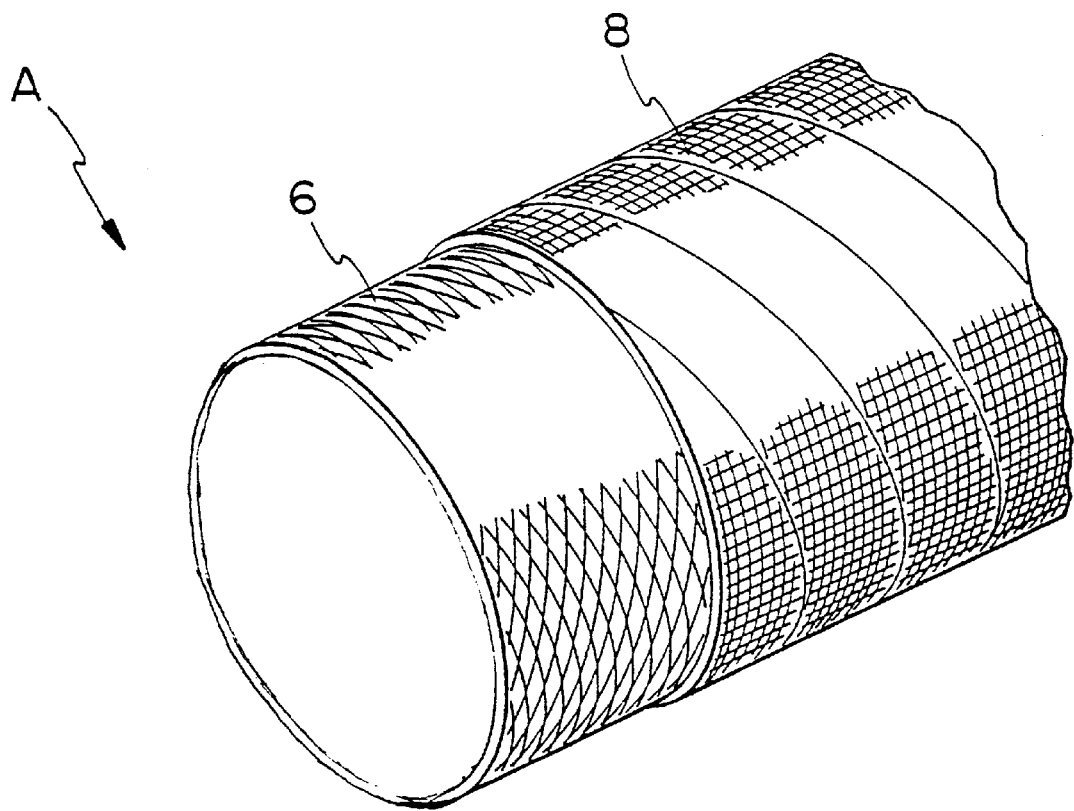
FIG. 1 is perspective view of a conduit according to the present invention with a portion of the inner layer uncovered for illustrative purposes.

The present invention is a composite conduit having increased corrosion/abrasion and fire retardant properties and a method for manufacturing and joining portions of such a composite conduit.

Turning to FIG. 1, the conduit or duct A is shown to comprise an inner layer 6 constructed from one or more layers of a composite glass reinforced fabric structure encased in a chemically resistant resin such as a halogenated vinylester resin. Halogenated vinylester resins are known to provide effective chemical resistance to most types of acids, caustics and solvents and have become the preferred resin of choice for such applications. In order to make the inner layer 6 an inherently chemical resistant layer and fire-resistant layer, about 3% to about 15% of antimony trioxide or antimony pentoxide may be added to the resin.

Conduit A also comprises an outer layer 8 disposed onto the exterior surface of the inner layer 6. According to the present invention, outer layer 8 comprises one or more layers of a composite glass reinforced fabric structure saturated with a fire retardant, modified gypsum-based cement material. The outer layer 8 including gypsum type material also provides the duct with improved chemical resistance.

A gypsum type material within the meaning of the present invention is any calcium sulfate based material and in a preferred embodiment of the present invention it is a so-called gypsum cement; namely, a cement consisting essentially of a calcium sulfate and which is produced by the partial dehydration of gypsum to it's hemihydrate form. Gypsum cements according to the present invention may of course contain the usual minor ingredients found in such cements, such as aluminum sulfate, potassium sulfate, potassium carbonate, borax or the like.

In certain applications, it may be necessary to modify the gypsum material in outer layer 8 to render it flexible and resilient since pure gypsum is often too brittle for practical use. Thus, it is within the scope of the present invention to provide a polymer modified gypsum material having such polymer additives so as to render the gypsum cement material sufficiently flexible and resilient for use as the outer layer.

In a preferred embodiment, the polymer modified gypsum material applied to the fiberglass wrap forming the outer layer 8 will comprises in percent weight of the total composition about 60% to 70% gypsum, about 30% to 40% acrylic copolymer emulsion, about 5% to about 6% melamine formaldehyde resin and about 0.3% to about 0.5% ammonium chloride.

In a specific example of the present invention, a fire resistant material for forming the outer layer was formulated by intermixing ten pounds of gypsum, five pounds of acrylic copolymer emulsion, one pound of melamine formaldehyde resin and twenty-two grams of ammonium chloride. The material was suitable viscous so as to be easily handled during manufacture of the conduit yet retained sufficient gypsum content and therefore rendered to end product conduit appropriately fire resistant.

It is within the scope of the present invention to modify the above formulation depending upon the desired characteristic of the end product conduit or duct. For example, the acrylic copolymer emulsion increased to render the composition less viscous thereby improving the coating characteristics of the material. In certain applications, i.e. construction of ducts having an unusual size or shape, a less viscous composition will improve handling of the material and thereby improve manufacture. However, if increased fire resistance is required, the gypsum content is proportionally increased while the acrylic copolymer emulsion content may be reduced.

The method of making a composite conduit according to the present invention comprises the steps of providing a mold/mandrel, coating the mold/mandrel with an catalyzed vinylester resin, applying a fiberglass or synthetic material on the coated mold/mandrel and coating the glass or synthetic material with additional catalyzed resin to form an inner layer of the conduit.

An intermediate layer is then applied onto the exterior of the inner layer by coating of the inner layer with additional catalyzed resin, applying a fiberglass or synthetic material on the coated inner layer and continuing to do so until the desired thickness is achieved. The inner and intermediate layers together comprise a corrosion resistant barrier according to the present invention.

The corrosion resistant barrier is then covered with another layer of fiberglass or other similar wrapping material. This layer of fiberglass material may be applied onto the inner layer 6 prior to curing of the inner layer resin so that at least a portion of this layer is saturated with the resin forming the inner layer. Additional fiberglass wrap is applied until a desired thickness is obtained. This layer of additional fiberglass wrap is then saturated with gypsum material with or without the additive noted above and cured to form the external layer. As is apparent, additional layers of fiberglass and resin or other sheet material known in the art may be added to the external layer 8 as desired (not shown). The resin or sheet material selected for the additional layers may provide, for example, increased rigidity or strength to the conduit or duct or other characteristics depending upon the end use of the duct. Additionally, the thicknesses for the various layers may be uniform or varied depending upon the corrosion or fire resistant properties or the type or resin or gypsum used.

A composite conduit as set forth above will therefore provide an internal layer 6 that is corrosion and/or abrasion resistant and also functions as a barrier for conveying corrosive or abrasive media and an external layer 8 that is fire resistant and acts as a fire retardant barrier. As is apparent, it is within the scope of the present invention to provide an inner layer 6 that is fire resistant whereas the outer layer 8 is corrosion resistant or to add additional intermediate, interior or exterior layers having a variety of characteristics. For example, veils or other barrier layers or materials known in the art may be incorporated for purposes of electrically grounding the duct or improving strength or the like.

The fibrous reinforcing material incorporated into the interior of the conduit according to the present invention may comprise a fabric constructed from natural materials such as glassfiber, graphite, carbon, ceramic or other natural material as well as combinations of such natural materials. The fibrous reinforcing material may alternatively be a fabric constructed from synthetic materials such as a polyester veil fabric sold under the name NEXUS®, a polytetrafluoroethylene generically known in the industry as teflon®, a ECTFE (copolymer of ethylene and chlorotrifluoroethylene) generically known as Halar®, a PVDF (polyvinylidenefluoride) generically known as Kynar®, or any other synthetic material meeting the requirements of the present invention as well as combinations of the above materials.

The fibrous reinforcing material forming the inner layer 6 may also be impregnated with a fire retardant halogenated vinylester resin material, a fire retardant halogenated polyester resin material, a fire retardant halogenated epoxy resin, a fire retardant halogenated bisphenol fumarate resin as well as sufficient amounts of antimony trioxide, antimony pentoxide or the like so as enhance the interior layer fire and smoke generation properties.

The fibrous reinforcing material used in the external layer 8 may be a fabric or a filament made from natural material such as glassfiber, graphite, carbon, ceramic or any other natural materials or combinations thereof as well as synthetic materials such as the earlier noted polyester veil, copolymer of ethylene and chlorotrifluoroethylene, PVDF, or other synthetic materials and combinations thereof.

The outer layer 8 comprising a fabric or a filament is impregnated with a fire retardant gypsum material modified with a thermoforming synthetic polymer and/or copolymer such as methylmethacrylate commercially Acrylic® or any such other resilient polymers/copolymers that enhance the physical properties of the gypsum material; namely, flexural and elongation strength. The outer layer fabric or filament may also be impregnated with a fire retardant gypsum material modified for flexural and elongation strength with a synthetic thermosetting polymer/copolymer commercially known as Melamine®.

The method of making a composite conduit as set forth above comprises the steps of providing a mold/mandrel formed in the desired shape of the end product conduit including various cross sectional and contour shapes. The mold/mandrel is coated with a suitable release agent such as a silicone wax and/or polyester film commercially Mylar®. A first coat of a catalyzed resin is applied onto the mold/mandrel surface. The fabric material is then laid onto the resin coated mold/mandrel surface and rolled until fully impregnated with resin as it cures. Additional resin is coated onto the surface and additional fabric is laid out onto the resin until the fabric is fully saturated with the resin and the required thickness of the inner layer is achieved.

Additional catalyzed resin may be applied onto the inner layer if desired. A more specialized fabric known as "continuous strand mat" may then be applied onto the resin coated mold surface and in such a manner that only the underside surface of the fabric is embedded into the resin. The modified catalyzed gypsum cement material is thereafter applied and rolled onto the fabric and in a manner so as to cause it to be partially embedded into the inner layer resin whereby the continuous strand mat is caused to bind the two substrates and provide respective inner and outer layers having a good inherent bond therebetween.

Additional fabric or filament may be applied onto the modified gypsum cement material and additional modified gypsum cement material may also be applied until a desired thickness is achieved. A fabric is then laid on top of the last coat of modified gypsum material to provide a good surface finish. The modified gypsum material is allowed to harden and cure after which the cured conduit is removed from the mold/mandrel in the usual manner. A top coat of paint, metalized or metal foil or any other aesthetic means may then be applied to enhance the exterior appearance of the conduit.

Many other variations and embodiments of the above are within the scope of the present inventions. The fabric/filament may be saturated with the resin prior to application on the mold/mandrel and the fabric/filament may be saturated with the modified gypsum cement prior to application on the mold/mandrel. A bath may be provided for pre-saturating the fabric/filament with the resin prior to application on the mold/mandrel as well as for pre-saturating the fabric/filament with the modified gypsum cement prior to application on the mold/mandrel.

The process may include removing excess modified gypsum cement material after application of the fabric/filament in an amount sufficient to provide a desired thickness for the outer layer. It may also be necessary to provide viscosity control for the resin material before application to the fabric/filament on the mold/mandrel. This may be done by controlling temperature of the resin or otherwise modifying the chemical components of the resin mixture. Viscosity control for the modified gypsum material is achieved through the addition of heat, water or a modification of the chemical components within the material.

The resin material and the modified gypsum material may be cured using an ultra violet cure system or similar photo cure known in the art.

In the present method, the inner layer may or may not be allowed to harden and set before the outer layer is applied and further, a bonding agent as is known in the art may be used to bond the two layers. In the alternative, the layers may be cured together without the use of a bonding agent. In addition, the process includes the step of applying heat to postcure the composite conduit.

The present invention also includes a method for joining two portions of a composite conduit as set forth above comprising the steps of providing at least two similarly sized end portions of a conduit system requiring bonded. The depth of cut using a electric circular saw or similar device is adjusted in relation to the combined thickness of the top coat and the modified gypsum material. The saw or other device will then be used to score up to the depth of the inner layer circumferentially entirely around each of the conduits, typically around four to eight inches from each end. The depth of the inner layer is then scored up, starting from the circumferential score, in straight scores up to the end of both conduits, and making as many such scores as required at around six inch intervals. A sharp object, such as a screwdriver, is then used to pry up the scored portions of the upper sections of each of the conduits to remove all such quadrants from the conduits, and so as to expose the bare ends of just the inner layer of the conduits. The two cut ends of the conduits are then brought together and in a manner whereby steps of about 16.c. to about 16.m. may be repeated, and replacing the original mold/mandrel with the actual portions of the duct, so as to bond the two portions together.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What we claim is:

1. A composite conduit comprising an inner layer of fibrous material impregnated with a corrosion resistant resin and a fire resistant outer layer thereon, said outer layer comprising a fibrous material saturated with an impregnation component, said impregnation component including an effective amount of calcium sulfate having intermixed therewith an additive, said additive comprising an effective amount of modifying resin material adapted to render said calcium sulfate sufficiently flexible and resilient for use as said outer layer of said composite conduit, said effective amount of calcium sulphate comprising the majority of said impregnating component.

2. A composite conduit as in claim 1 and wherein said modifying resin material is an acrylic copolymer emulsion.

3. A composite conduit as in claim 1 and wherein said modifying resin material is a melamine formaldehyde resin.

4. A composite conduit comprising an inner layer of fibrous material impregnated with a resin material adapted to provide corrosion resistance and a fire resistant layer outer layer thereon, said outer layer comprising a fibrous material impregnated with a composition comprising by weight of the total composition the following ingredients:

a) about 60 to about 70% gypsum;

b) about 30% to about 40% acrylic copolymer emulsion;

c) about 5% to about 6% melamine formaldehyde resin; and d) about 0.3% to about 0.5% of ammonium chloride.

5. A composite conduit comprising an inner layer of fibrous material impregnated with a corrosion resistant resin and a fire resistant outer layer thereon, said outer layer comprising a fibrous material impregnated with an effective amount of calcium sulfate having intermixed therewith an effective amount of modifying resin material adapted to render said calcium sulfate sufficiently flexible and resilient for use as said outer layer of said composite conduit and wherein said modifying resin material is an acrylic copolymer emulsion.

6. A composite conduit comprising an inner layer of fibrous material impregnated with a corrosion resistant resin and a fire resistant outer layer thereon, said outer layer comprising a fibrous material impregnated with an effective amount of calcium sulfate having intermixed therewith an effective amount of modifying resin material adapted to render said calcium sulfate sufficiently flexible and resilient for use as said outer layer of said composite conduit and wherein said modifying resin material is a melamine formaldehyde resin.

7. A composite conduit comprising an inner layer of fibrous material impregnated with a corrosion resistant resin and a fire resistant outer layer thereon, said outer layer comprising a fibrous material saturated with an impregnation component, said impregnation component including an effective amount of gypsum cement material having intermixed therewith an additive, said additive comprising an effective amount of modifying resin material adapted to render said gypsum cement material sufficiently flexible and resilient for use as said outer layer of said composite conduit, said effective amount of gypsum cement material comprising the majority of said impregnating component.

* * * * *